(12) United States Patent
Burmeister et al.

(10) Patent No.: US 9,694,497 B2
(45) Date of Patent: Jul. 4, 2017

(54) ROBOT ARRANGEMENT AND METHOD FOR CONTROLLING A ROBOT

(75) Inventors: Sören Burmeister, Fürth (DE);
Matthias Dürr, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 4 days.

(21) Appl. No.: 14/414,050

(22) PCT Filed: Jul. 10, 2012

(86) PCT No.: PCT/EP2012/063500
§ 371 (c)(1),
(2), (4) Date: Jan. 9, 2015

(87) PCT Pub. No.: WO2014/008929
PCT Pub. Date: Jan. 16, 2014

(65) Prior Publication Data
US 2015/0158178 A1 Jun. 11, 2015

(51) Int. Cl.
*B25J 9/16* (2006.01)
*G06T 1/00* (2006.01)
(Continued)

(52) U.S. Cl.
CPC ........... *B25J 9/1676* (2013.01); *B25J 9/1666* (2013.01); *B25J 9/1697* (2013.01);
(Continued)

(58) Field of Classification Search
None
See application file for complete search history.

(56) References Cited

U.S. PATENT DOCUMENTS 7,257,237 B1 * 8/2007 Luck ..................... A61B 5/1113
382/103
8,160,745 B2 * 4/2012 Sugiura .................. B25J 9/1666
700/245
(Continued)

FOREIGN PATENT DOCUMENTS

CN 101512452 A 8/2009
CN 101512453 A 9/2009
(Continued)

OTHER PUBLICATIONS

Onishi K. et al; 3D Human Posture Estimation Using the HOG Features from Monocular Image; 19th Inemational COnference on Pattern Recognition, 2008: ICPR 2008; Dec. 8-11, 2008, Tampa, Florida, USA, IEEE, Piscataway, NJ; pp. 1-4;ISBN: 978-1-4244-2174-9;; 2008; US: Dec. 8, 2008.

*Primary Examiner* — Kim Vu
*Assistant Examiner* — Nathan Bloom
(74) *Attorney, Agent, or Firm* — Henry M. Feiereisen, LLC (57) ABSTRACT

A method for controlling a robot, which is designed to be operated in a working mode, in which a part of the robot is moved at a speed at which there is a risk of injury to a person. The working mode is deactivated if a safety device detects that the person has entered an action region of the displaceable part. The aim is to make close cooperation possible between the person and the robot. A sensor unit determines a position and a posture of the person while the person is outside the action region of the part. A prediction unit determines an action region of the person. A collision monitoring unit monitors whether the two action regions overlap. The robot can optionally be switched from the working mode into a safety mode.

14 Claims, 3 Drawing Sheets

(51) Int. Cl.
  *G06K 9/00*     (2006.01)
  *G06T 7/20*     (2017.01)
  *G06T 7/246*    (2017.01)
  *G06T 7/73*     (2017.01)
  *G05B 19/4061*  (2006.01)

(52) U.S. Cl.
  CPC ..... *G05B 19/4061* (2013.01); *G06K 9/00335* (2013.01); *G06T 1/0014* (2013.01); *G06T 7/251* (2017.01); *G06T 7/75* (2017.01); *G05B 2219/39082* (2013.01); *G05B 2219/39091* (2013.01); *G05B 2219/39097* (2013.01); *G05B 2219/40201* (2013.01); *G06T 2207/10016* (2013.01); *G06T 2207/30196* (2013.01); *Y10S 901/09* (2013.01)

(56) References Cited

U.S. PATENT DOCUMENTS

| | | | | |
|---|---|---|---|---|
| 8,933,884 | B2* | 1/2015 | Markovic | A63F 13/213 345/158 |
| 2002/0121291 | A1* | 9/2002 | Daum | B60S 3/008 134/8 |
| 2005/0163349 | A1* | 7/2005 | Brunner | A61B 5/1038 382/110 |
| 2006/0189902 | A1* | 8/2006 | Takai | G11B 19/08 600/595 |
| 2008/0161970 | A1* | 7/2008 | Adachi | B25J 9/0003 700/253 |
| 2010/0030532 | A1* | 2/2010 | Arora | G06T 13/40 703/2 |
| 2011/0036188 | A1* | 2/2011 | Fujioka | B25J 9/102 74/405 |
| 2012/0143374 | A1* | 6/2012 | Mistry | B62D 57/032 700/259 |
| 2012/0182155 | A1* | 7/2012 | Sato | B25J 9/1674 340/686.6 |
| 2014/0031668 | A1* | 1/2014 | Mobasser | A61B 19/5244 600/409 |
| 2014/0067121 | A1* | 3/2014 | Brooks | B25J 9/1676 700/255 |

FOREIGN PATENT DOCUMENTS

| | | |
|---|---|---|
| CN | 102323822 A | 1/2012 |
| DE | 10216023 A1 | 11/2003 |
| DE | 10218023 A1 | 11/2003 |
| DE | 10324827 A1 | 1/2005 |
| DE | 102005003827 A1 | 7/2006 |
| DE | 10320343 B4 | 5/2008 |
| DE | 102007007576 A1 | 8/2008 |
| DE | 102007033891 A1 | 1/2009 |
| EP | 2110724 A1 | 10/2009 |
| JP | 2010120139 A | 6/2010 |
| WO | WO 2008014831 A2 | 2/2008 |
| WO | WO 2009155946 A1 | 12/2009 |
| WO | WO 2011089885 A1 | 7/2011 |
| WO | WO 2010063319 A1 | 6/2012 |

* cited by examiner

ROBOT ARRANGEMENT AND METHOD FOR CONTROLLING A ROBOT

CROSS-REFERENCES TO RELATED APPLICATIONS

This application is the U.S. National Stage of International Application No. PCT/EP2012/063500, filed Jul. 10, 2012, which designated the United States and has been published as International Publication No. WO 2014/008929.

BACKGROUND OF THE INVENTION

The invention relates to a robot which is operable in a work mode in which part of the robot is moved at a speed at which there is a risk of injury to a person if they collide with the part. The robot comprises a safeguarding apparatus which deactivates the work mode if the person is situated in an action range of the movable part. The invention also includes a method for controlling the robot. By way of example, the robot can be used in a handling system.

Handling systems and similar modern workspaces ever more frequently require situations in manufacturing in which efficient cooperation between a person and a robot is required. In general, the closer the cooperation can be, the more efficient it is. However, working in a common work space is linked with great risks for the person. Commercially available industrial robots may have such a high mass of the movable parts and generate such a movement speed of same that the risk of injury in the case of a collision with a person is very high for said person. In order to ensure protection here, provision can be made for identification of when a person comes too close to the robot by means of a sensor system of the robot (e.g. proximity sensors, light curtains or cameras). Optionally, the robot is then slowed down, stopped or moved away in order thus to defuse the dangerous situation.

In order to reliably preclude the danger of a collision, the corresponding safety distance, where the robot is slowed down if it is breached, must be selected to be comparatively large. Only this ensures that there is enough time for the robot to be able to slow down or deflect the part in good time even in the worst case scenario, where the person enters the action range of a movable part of the robot very quickly, for example because they stumble. However, since such a worst case only occurs very seldom and significantly smaller safety distances would suffice in the normal case, such safety precautions mean that the work mode of the robot, in which it performs its work unhindered with the highest possible speed, is often unnecessarily interrupted.

SUMMARY OF THE INVENTION

An object of the present invention is to enable efficient cooperation between a person and a robot without in the process putting the person in danger.

According to one aspect of the invention, the object is achieved by a method for controlling a robot, which is embodied to be operable in a work mode in which part of the robot is moved at a speed in which there is a risk of injury to a person if the person collides with the part, wherein the work mode is deactivated if a safeguarding apparatus identifies that the person enters an action range of the movable part, with the method including the following steps: establishing a position and body posture of the person by a sensor unit of the safeguarding apparatus while the person is situated outside of the action range of the part, establishing an action range of the person by a prediction unit of the safeguarding apparatus, the action range being defined by locations which are expected to be reachable within a predetermined time interval by the person from the established body posture, checking whether the action range of the person and the action range of the movable part intersect by means of a collision monitoring unit of the safeguarding apparatus and, if necessary, switching the robot from the work mode into a safety mode, in which the speed of the part is reduced and/or the part is guided past the person in order to avoid injury to the person.

According to one aspect of the invention, the object is achieved by a robot arrangement including a robot with a part that is movable by a drive of the robot, a safeguarding apparatus having a sensor unit for registering a position of a person, wherein the safeguarding apparatus additionally includes a prediction unit and a collision monitoring unit and is configured for performing a method as set forth above.

Advantageous developments of the method according to the invention are specified by the dependent claims.

The invention proceeds from a robot arrangement as described at the outset, in which, in a work mode of the robot, part of same is moved at a speed at which there is a risk of injury to a person if they collide with the part. By way of example, the robot arrangement can be used in a handling system of the type described above. The robot arrangement includes the robot per se, with its part that is movable by a drive of the robot. Moreover, the robot arrangement comprises a safeguarding apparatus with a sensor unit for registering a position of the person. In the robot arrangement according to the invention, provision is additionally made in the safeguarding apparatus for a prediction unit for predicting a position and a collision monitoring unit for identifying a potential collision. The robot arrangement according to the invention is designed to perform one of the embodiments of the method according to the invention described below.

In the robot arrangement according to the invention, the collision unit provides for the work mode to be deactivated if an entry of the person into an action range of the movable part is identified. Here, the action range of the part means the set of those locations which potentially can be arrived at by the part within a predetermined time interval. To this end, the sensor unit establishes, for example by means of a camera, where the person is situated even while the person is still situated outside of the action range of the part. Additionally, the body posture of the person is also established.

The prediction unit then also establishes an action range of the person. Said action range is defined by locations which are expected to be reachable within a predetermined time interval by the person from their current position and the established body posture. Thus, there now are two action ranges, one of the movable part of the robot and one of the person.

The collision monitoring unit checks whether the two action ranges intersect. If this is the case, the robot is switched from the work mode into a safety mode, in which the speed of the part is reduced and/or the part is actively guided past the person in order to avoid injury to the person.

The advantage of the method according to the invention is that the work mode of the robot, in which it operates most efficiently and therefore most economically, is not already deactivated if a person is only situated in the vicinity of the action range of the movable part, i.e. if a specific safety distance is breached. Rather, there now is a situation identification, by means of which a check is carried out as to whether the person is even able to enter the action range of the movable part within the predetermined time interval. Only if this is the case is there really the risk of a collision. Otherwise the movable part can continue to be moved with an unchanged speed, i.e. the robot can be left in the work mode. Here, the core idea of the invention is that movements of the person are subject to physical restrictions which, within a specific time interval, only enable an advance within a restricted action radius. Accordingly, there is a delay between the time at which the person starts to enter a dangerous situation (for example by virtue of making a step to one side or an inattentive arm movement) and the time at which the dangerous situation in fact occurs because the person is now in fact situated within the action range of the movable part. Therefore, dangerous situations can be identified and defused in good time using a sufficiently detailed analysis of the body posture of the person by the aforementioned sensor unit. In order to enable safe cooperation between the robot and persons, all that needs to be ensured is that this person is always in a situation in which enough time remains for the safeguarding apparatus between identifying danger and the dangerous situation to seize suitable countermeasures, i.e. to slow down the part or move the trajectory thereof around the person. Thus, it is possible in an advantageous manner to prevent a collision situation with a high risk of injury (that is to say e.g. in the case of an insufficiently slowed-down robot).

The sensor unit can additionally also establish at least one movement vector of at least one limb of the person and/or of the head of the person. Here, a movement vector means a data record which describes a direction and an acceleration potential of the respective body part. The action range of the person can be predicted more precisely and as a function of time by virtue of not only the posture of the person but also the speed of the limbs or of the head being known.

Another development of the method provides also for muscle activity of the person to be established by the sensor unit for establishing the action range of the person. By way of example, electrodes for measuring electric potentials on the skin of the person can, to this end, be provided in work clothing of the person. An upcoming movement of the person can already be identified on the basis of the muscle activity before it can be registered optically, for example by means of a camera. In particular, in the context of deactivating a work mode of the robot, even fractions of a second, for example a quarter of a second or a third of a second, can be sufficient for braking a movable part of the robot to such an extent that the risk of injury to a person is significantly reduced. Therefore, any gain of time when predicting a collision is a significant advantage.

In order to predict a movement direction of the person more precisely, an embodiment of the method provides for a direction of view of the person also to be established by the sensor unit for establishing the action range of the person.

Another option for predicting the direction of an upcoming movement is provided if a weight distribution of the person is registered by pressure sensors of the sensor unit on a floor on which the person stands. By way of example, in this manner it is possible to identify whether a person is about to make a step forward or backward.

The precise analysis of the situation of the person, i.e. not only establishing his position, but also his current posture and movements, provides an option for processing the sensor signals automatically to the extent that the intentions of the person can be identified and interpreted by a computer-based processing unit in order in this manner to identify dangerous situations before they become acute.

Preferably, a skeleton model is used to this end, as is known per as from image processing. Such a skeleton model is fitted to the observed posture of the person by the sensor unit. By way of example, if the person is registered optically by the sensor unit, the skeleton model can be modified by an iterative algorithm, e.g. by modifying tilt angles of the joints of the skeleton, until the posture of the skeleton model matches the observed posture. As a result of this, a digital image of the person in the current body posture is obtained by the fitted skeleton model.

In accordance with the development of this method, the body posture of the person represented by the skeleton model is assigned to one of a plurality of predetermined posture types, i.e., for example, the "standing person" or "leap posture" posture type. For this assignment, current position values of joint points of the skeleton model, i.e., for example, the bend or flex angle of a knee of the skeleton model, are compared to a plurality of predetermined intervals of possible position values. Thus, it is possible to identify for example whether the knee is stretched, slightly angled or strongly bent. It is then possible to establish the posture type from the totality of the current position values, i.e. information in relation to the bending angles of both knees, the curvature of the spinal column and the remaining joints of the skeleton model. A movement of the person and hence their action range can be established by the prediction unit on the basis of the established posture type. By way of example, if the person stands upright and is motionless, they cannot advance as far forward within the predetermined time interval, e.g. 0.5 seconds or 1 second, as they could proceeding from a leap posture.

In accordance with one development of the method, the sensor unit simulates in a similar manner at least the movable part of the robot by a skeleton model. The advantage emerging from this is that no explicit access to electronic position information of the robot is required, i.e. that the position of the robot is possible without a data link from an external sensor unit to the robot. Therefore, no technical adaptation of the robot is required for the latter to be able to output the position information thereof. Moreover, the sensor unit need not be designed for communication with the robot.

In the method according to the invention, it is possible to consider further information in addition to sensor information when establishing the action range.

By way of example, if the person is assembling a workpiece, fixedly prescribed work steps are generally to be carried out to this end. If these work steps are known, it is possible e.g. to predict when the person will reach next to themselves in order to pick up a tool which they require for carrying out the next work step. Accordingly, in accordance with a development of the method, the prediction unit can predict a movement of the person on the basis of a work procedure description, which describes a sequence of work steps which are to be carried out by the person in surroundings of the robot.

In a similar manner, a movement of the person can be predicted in accordance with another development of the method by the prediction unit on the basis of behavior rules which were prescribed for a behavior of the person in surroundings of the robot, that is to say e.g. traffic rules. By way of example, if the robot is a conveying means which drives in an assembly hall in which persons always have right-of-way, it is foreseeable that a person will not stop if they cross the path of the robot.

When taking account of the movement of the robot itself, i.e. the movable part thereof, the prediction unit can consider the programming of the robot in order to obtain an even more precise risk analysis. Thus, in particular, provision is made in this case for the action range of the movable part as a function of time to underlie the checking of the intersection. Since the trajectory of the part can be established very precisely on the basis of the programming, it is possible, for example, thus to predict that the part will have moved away from a specific location when the person reaches said location. Therefore, there is no need to deactivate the work mode in such a case.

As already explained above, a predetermined time interval forms a basis for establishing the action range of the person. It is particularly expedient in this case for the time interval to correspond to a transition duration which the robot requires to change from the work mode into the safety mode. Thus, for example, this can be the time duration required for braking the movable part to a speed at which a collision with the person no longer harbors a risk of injury.

In order to potentially avoid interrupting the work mode despite a potential collision being identified, provision can be made for the robot not to be switched immediately into the safety mode if an intersection between the action ranges of the person and of the movable part is identified. Rather, a development of the method provides for the collision monitoring unit to establish a time duration until the person reaches the action range of the part. The switchover then starts with such a delay that the switching process is only complete when the established time duration expires, but not substantially before this. Then, the established time duration corresponds to the delay time plus the switching time. By way of example, in other words, the moving part is not stopped immediately when the intersection of the action ranges is identified, but only once the remaining time until the predicted collision is just sufficient to bring the part e.g. to standstill at the collision time. Then, if there is identification in the meantime, i.e. prior to switching, that the person carries out a different movement than was initially predicted, it is optionally possible to dispense with switching and the robot can continued to be operated continuously in the work mode.

To this end, and also in conjunction with the remaining developments, the action range of the person is naturally preferably established continuously, i.e. repeatedly at predetermined times, and the collision monitoring is performed accordingly.

BRIEF DESCRIPTION OF THE DRAWING

In the following text, the invention will once again be explained in more detail on the basis of a specific exemplary embodiment. To this end.

DETAILED DESCRIPTION OF PREFERRED EMBODIMENTS

In the examples explained below, the described components of the robot arrangement and the described steps of the method in each case constitute individual features of the invention, which are to be considered independently of one another and in each case also develop the invention independently of one another and therefore should also be considered as a constituent of the invention, both individually or in a different combination than what is shown. Furthermore, the described embodiments can also be complemented by further, already described features of the invention.

Figure 1:
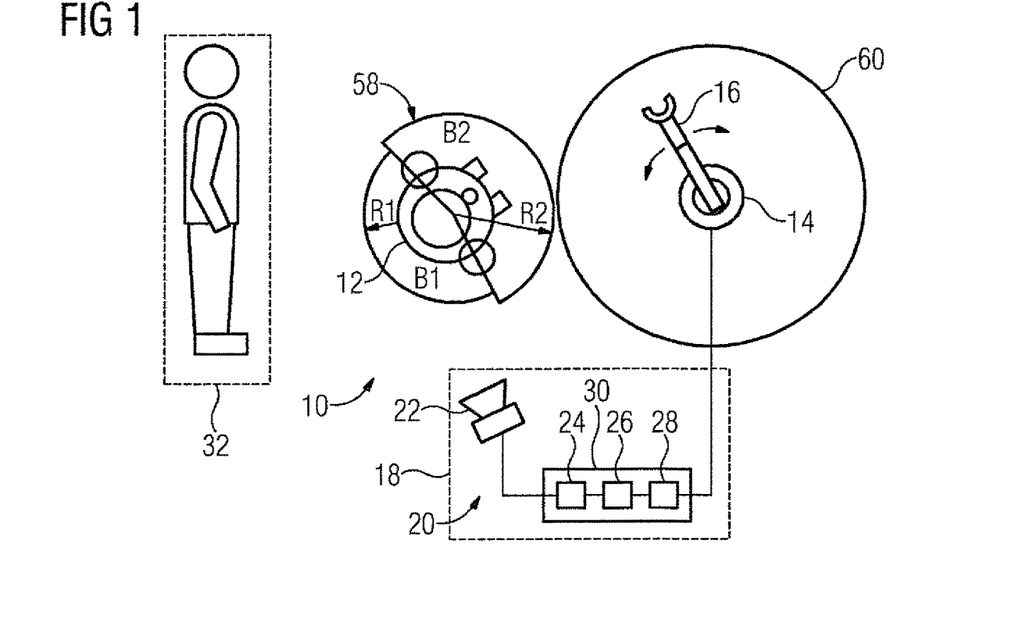
FIG. 1 shows a schematic illustration of a work space, in which a person and an embodiment of the robot arrangement according to the invention are situated.

FIG. 1 shows a plan view of a work region 10, in which a person 12 and a robot 14 are situated. An arm 16 of the robot 14 is swiveled during a work process by a drive (not depicted here) of the robot 14. The person 12 must likewise be situated in the work space 10 during the work process, for example because they pass workpieces to the robot arm 16 or receive such workpieces from said robot arm. Thus, the robot 14 and the person 12 must be able to cooperate closely in the work space 10. However, the person 12 should not, in the process, run the risk of being hit by the generally quickly moving robot arm 16 and being injured by the latter. Therefore, a safeguarding apparatus 18 is provided, the latter reducing the moving speed of the robot arm 16 or even stopping it, or else modifying the movement direction of the robot arm 16, whenever said safeguarding apparatus 18 identifies that the person 12 runs the risk of colliding with the quickly moving robot arm 16.

The safeguarding apparatus 18 comprises a sensor system 20, which can comprise e.g. a camera 22 and an image evaluation 24, a prediction apparatus 26, which predicts movements of the person 12 for a predetermined time interval, and collision monitoring 28, which actuates the robot 14 if a possible collision is predicted in order to at least introduce one of the above-described protection measures. The image evaluation 24, the prediction apparatus 26 and the collision monitoring 28 can, for example, be provided in the form of programs which are executed by a monitoring computer 30.

Figure 4:
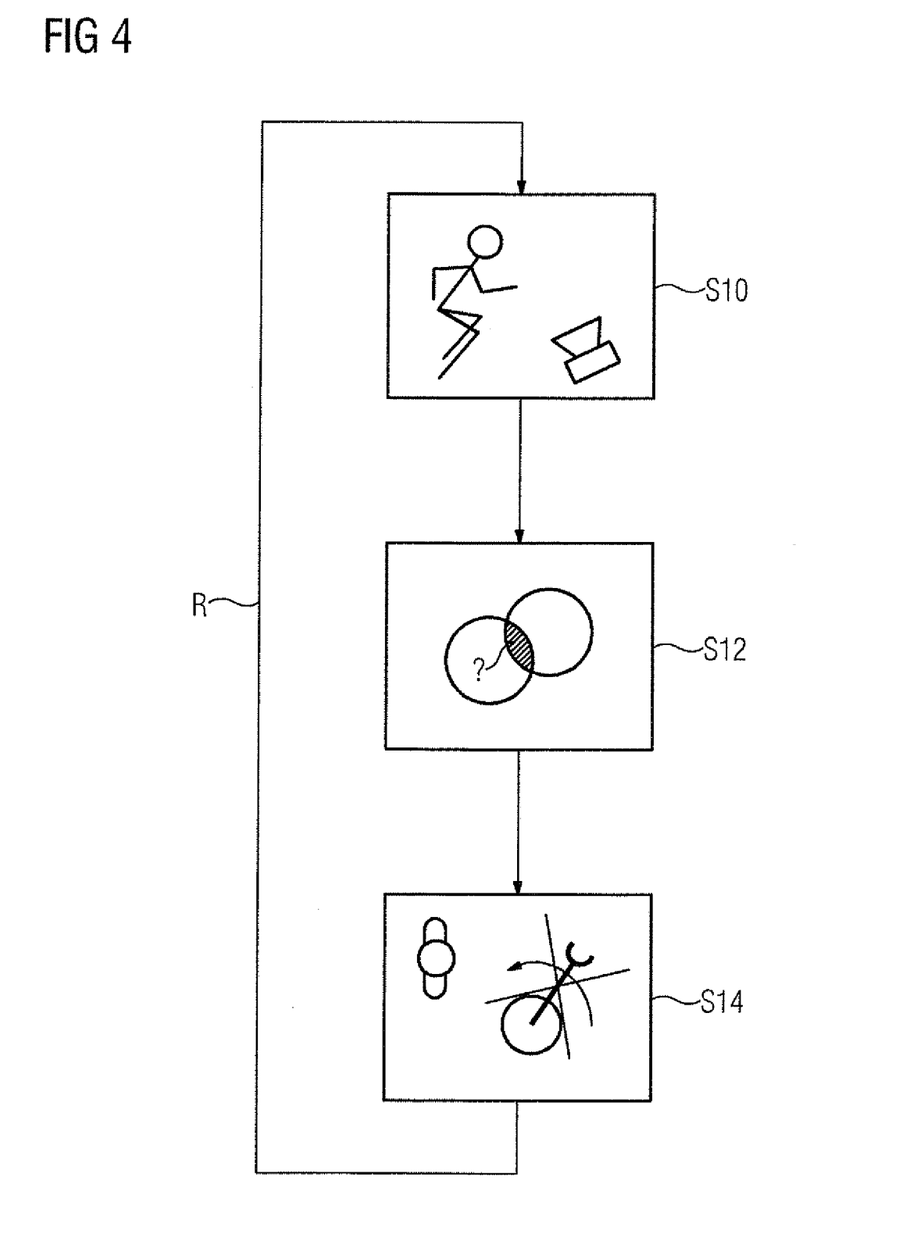
FIG. 4 shows a flowchart of an embodiment of the method according to the invention.

This monitoring routine, which is executed overall by the safeguarding apparatus 18, is exemplified in the image flowchart of FIG. 4.

In a step S10, the camera 22 and a situation identification algorithm of the image evaluation 24 assesses the dangerous situation not only on account of the vicinity of the person to the robot, but also by taking into account information about the current body posture and movement of the person 12. For exemplification purposes, FIG. 1 shows the camera image 32, which shows the person 12 from the perspective of the camera 22. In order to identify the body posture of the person 12, use can be made of e.g. the KINECT® system by Microsoft® or the NiTE® system by PrimeSense®. Identification systems of this type can identify the body posture of the person 12 and the movement directions of the limbs and of the head of the person relative to one another, and also the absolute movement of the person, on the basis of the camera image 32 and on the basis of signals from further sensors.

Figure 3:
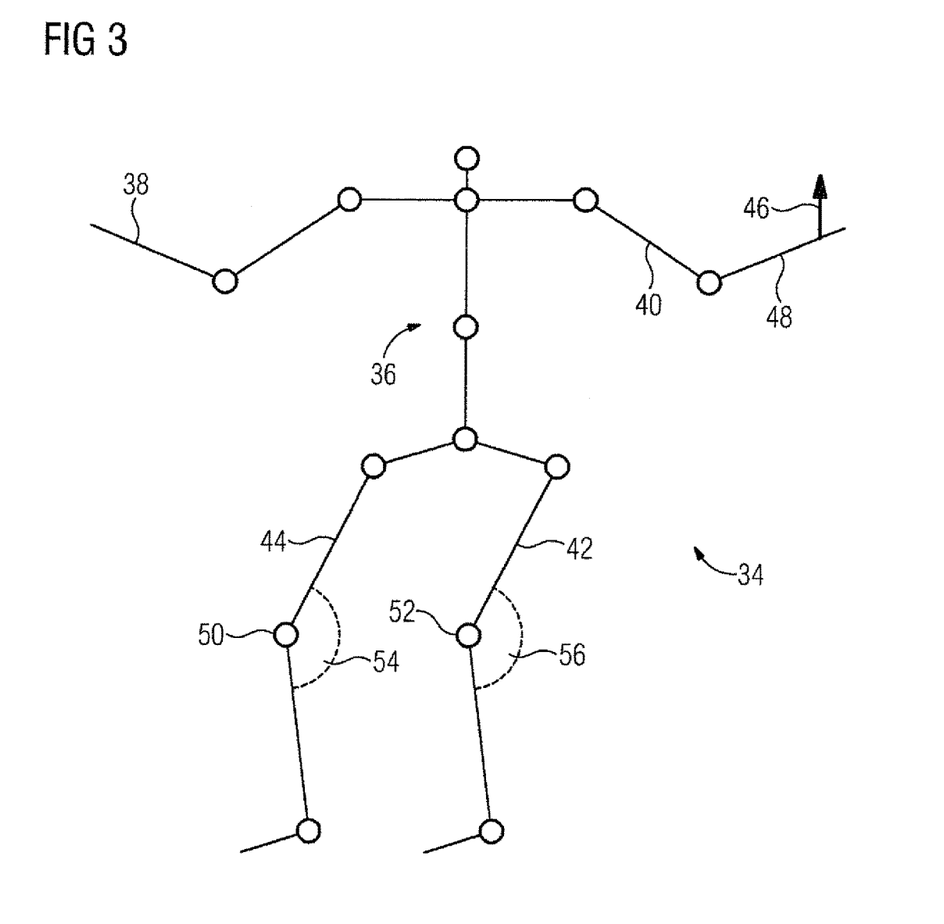
FIG. 3 shows a sketch in which parameters of a skeleton model are exemplified.

The identified positions of the body parts and the identified movements are described by means of a skeleton model. FIG. 3 exemplifies a parameter set of such a skeleton model. The skeleton model 34 can reproduce information in relation to e.g. the body trunk 36, the arms 38, 40 and the legs 42, 44. By way of example, in the skeleton model 34 in FIG. 3, a movement vector 46 is specified in relation to the left arm 40, which states that the forearm 48 of the left arm 40 is moving upward with a specific speed. In respect of individual joint points 50, 52, it is possible to specify the bending angle 54, 56 with which the joints are bent. For reasons of clarity, FIG. 3 only specifies a reference sign for the knee joints 50, 52.

The skeleton model 34 is made to match the image of the person 12 in the camera image 32 by the image evaluation 24. To this end, the values of the parameters of the skeleton model, that is to say e.g. the bending angles 54, 56, are for example modified and the respectively resulting posture of the skeleton is compared to the body posture of the person 12 in the camera image 32 until the posture of the skeleton corresponds to that of the person 12. The image evaluation 24 can also be proprietary image evaluation, e.g. the Kinect-SDK® or Prime Sense NITE® products.

On the basis of a subsequent comparison of the values for e.g. the bending angles 54, 56 with a plurality of predetermined angle intervals, the image identification 24 identifies that the knees 50, 52 are stretched and the person is therefore standing straight. In respect of the limbs 38 to 44 and the head of the person, the image evaluation 24 identifies that the movement vectors are very small. Also, an absolute movement vector for the overall body movement equals zero. The image evaluation 24 assigns a posture type to all these specifications, which in this case is referred to as "person standing still". This information is transmitted to the prediction unit 26. Special sensors for measuring relevant muscle activities of the person 12 can also be provided for the posture identification and movement identification.

The prediction unit 26 checks whether the person is moving into a dangerous situation, i.e. whether they threaten to come too close to the robot arm 16. It is even possible to perform an even earlier identification by means of sensors for the muscle activities. The prediction unit 26 determines action radii R1, R2 for evaluating the situation on the basis of the information regarding the body posture and movement of the person 12. The magnitude of the radii R1, R2 can e.g. equal the distance which the person 12 can pass over within a predetermined time interval, either with their whole body or else with only one limb, from their current body posture and taking account of the current movement if they make the most concerted effort in this respect or else e.g. trip and therefore move quickly. The action radii R1, R2 define two portions B1, B2 which describe the possible backward (B1) or forward (B2) movement of the person 12. Overall, the portions B1, B2 describe an action range 58 of the person 12. The action range 58 can thus be determined by the physically maximally possible movement behavior of the person 12.

The time interval underlying the establishment of the action range 58 is set to the value corresponding to the time duration required to put the robot into a non-dangerous state, i.e., for example, to bring the robot arm 16 to rest. In the following, the time interval is referred to as an observation interval.

An action range 60 is also assigned to the robot 14, said action range for example possibly being determined by the possible movements of the robot arm 16 and by the size of the workpieces (not depicted here) transported by the robot arm 16 in the process.

The prediction unit 26 can then perform a dynamic and situation-dependent risk classification. Thus, provision can be made in a step S12 for a risk class in which the person is currently situated to be determined by the prediction unit 26 on the basis of the data received by the image evaluation 24. A risk class RK0 may be determined, which indicates no danger of a collision. No situation in which there is a risk of a collision can occur within the observation interval, not even in the so-called worst case. A risk class RK1 states that there is no acute risk of a collision but the person 12 has the possibility of quickly entering into collision zones such that the robot must be prepared accordingly. This risk class can be further subdivided depending on the minimum time which the person requires for entering into the danger zone. Thus, for example, the robot can continue to work largely unaffected if this transition is possible theoretically, but the person makes no move to undertake this transition and it is therefore certain that a transition can be identified in good time. By way of example, if a person is seated at a worktable and has both feet on the ground, there is, in principle, no danger of the person moving suddenly; however, if said person has just lifted the right leg and moves it to the right, this indicates that they could enter the danger zone with a step to the right. Therefore, in such a situation, a movable part of a robot should already be decelerated now in a step S14.

A risk class RK2 states that the person is already situated too close to the robot, i.e., for example, in the action range 60 in this case, and so there is an acute risk of collision. The robot must be brought into safe mode as quickly as possible, that is to say e.g. decelerated or even stopped, when the risk class RK2 is identified. If countermeasures were not already introduced during the transition phase, i.e. during the presence of risk class RK1, the reaction speed may possibly not suffice, and so severe injuries may occur. The process of situation identification, risk classification and possibly measure adoption by the safeguarding apparatus 18 is performed continuously, i.e. there is a recursion R.

In the example exemplified in FIG. 1, the action range 58 is comparatively small since the person 12 is standing still. Therefore, the person 12 cannot reach the direct danger zone of the robot, which is defined by the action range 60, within the observation interval. This is identified by virtue of the action ranges 58, 60 not intersecting. Therefore, the robot 14 can operate undisturbed, i.e. there is no need to reduce the movement speed of its robot arm 16 for as long as the person 12 maintains their body posture and does not change their action range 58. The calculation is performed continuously as a result of the recursion R, and so the risk classification is always current. By contrast, when using previous standard technology with only a distance measurement, this situation would be assigned to the risk class RK2 since this "gray area" could not be used in this case. Only by the use of additional methods based on the approach according to the invention is it possible to analyze this RK1 in more detail in order to decide which situation can be classified as "no danger" or as "action necessary".

Possible countermeasures that can be adopted in step S14 lie in delimiting the speed and the forces generated by the robot arm 16. It is also possible to emit warning signals. For the reduction in speed, it is also possible to derive admissible limit values for the current movement trajectory of the robot arm 16.

Figure 2:
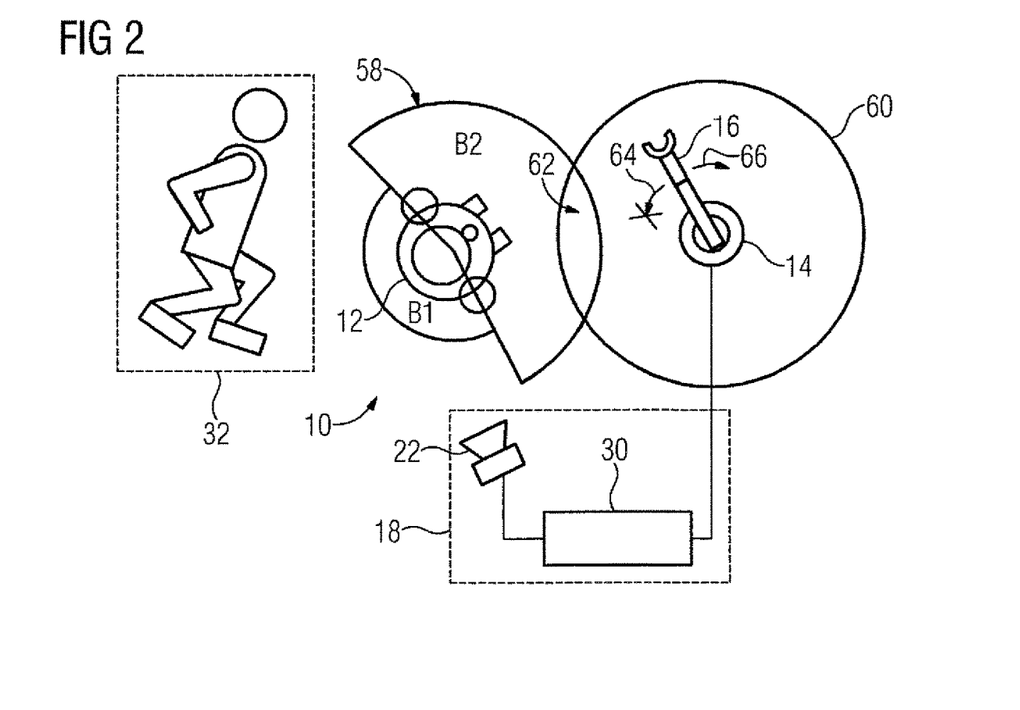
FIG. 2 shows a schematic illustration of the work space from FIG. 1, wherein the person is situated in a different situation.

FIG. 2 is used to explain in an exemplary manner how the safeguarding apparatus 18 can react in the case of a change in the body posture of the person 12. In the example of FIG. 2, the person 12 has assumed a leap posture. When fitting the skeleton model 34 to the body posture of the person 12 identifiable in the camera image 32, a very small value, i.e. an acute angle, emerges for the bending angles 54, 56 of the knees 50, 52. The remaining bending angles of the joints are also modified accordingly. By comparing the current values for the individual bending angles with the predetermined intervals for the angle values, the image evaluation 24 overall is used to identify that the person has a squat posture and could be getting ready to leap. Accordingly, the totality of the current values of the parameter of the skeleton model 34 is assigned to a "leap posture" posture type in step S10.

Proceeding from the leap posture in step S12, the prediction unit 26 establishes an action range 58 of the person 12 which is greater than the action range emerging for a person standing still. The reason for this is that the person 12 is able to travel over a larger distance within the observation interval proceeding from the leap posture.

The collision monitoring 28 identifies that there is an intersection region 62 between the action range 58 of the person and the action range 60 of the robot 13. Thus, the risk class RK1 is present, namely a possible collision. Accordingly, the collision monitoring 28 e.g. blocks movements 64 of the robot arm 16 in the direction of the intersection region 62 in the present example. By contrast, the robot arm 16 can perform the remaining movements 66 without hindrance. This results in a minimal intervention into the freedom of movement of the robot arm 16.

The example shows how the person 12 and the robot 14 can work in close proximity next to one another without disturbance and, in the process, the robot 14 can be operated with a very high efficiency, without the safety of the person having to suffer as a result of this.

What is claimed is:

1. A method for controlling a robot in an industrial environment, comprising:
   determining by a camera of a safeguarding apparatus a position and body posture of a person situated outside of an action range of a movable part of a robot;
   determining an action range of the person by a monitoring computer of the safeguarding apparatus in response to the determined body posture to thereby define the action range by locations expected to be reachable within a predetermined time interval by the person, wherein the monitoring computer predicts a movement of the person based on a behavior rule prescribed for a behavior of the person in a surrounding of the robot, said person always having a right-of-way and said person not stopping if said person crosses a path of the robot;
   determining a risk class RK0 which indicates no danger of a collision, or a risk class RK1 which indicates no acute risk of a collision but the person has the possibility to enter into a collision zone such that the robot is prepared, or a risk class RK2 which indicates that the person is too close to the robot such that there is an acute risk of a collision by the monitoring computer in response to data received by the camera;
   checking by a collision monitoring computer of the safeguarding apparatus whether the action range of the person and the action range of the movable part intersect; and
   switching the robot from a work mode into a safety mode to reduce a speed with which the movable part moves or to guide the movable part past the person, in the event the action range of the person and the action range of the movable part intersect so as to avoid a collision of the person with the movable part and injury to the person.

2. The method of claim 1, wherein the action range of the person is determined by ascertaining at least one movement vector of at least one limb and/or a head of the person.

3. The method of claim 1, wherein the action range of the person is determined by ascertaining a muscle activity of the person.

4. The method of claim 1, wherein the action range of the person is determined by ascertaining a direction of view of the person.

5. The method of claim 1, wherein the action range of the person is determined by a pressure sensor of the camera to ascertain a weight distribution of the person standing on a floor.

6. The method of claim 1, wherein the camera matches a skeleton model to an observed body posture of the person.

7. The method of claim 6, further comprising comparing current position values of joint points of the skeleton model to predetermined intervals of possible position values, and assigning a totality of the current position values to one of a plurality of predetermined posture types.

8. The method of claim 1, wherein the camera simulates at least the movable part of the robot by a skeleton model.

9. The method of claim 1, wherein the monitoring computer predicts a movement of the person based on a work procedure description, which describes a sequence of work steps which are to be carried out by the person in a surrounding of the robot.

10. The method of claim 1, wherein the prediction unit determines a movement of the movable part based on a programming of the robot and the action range of the movable part as a function of time forms a basis, when the action range of the person and the action range of the movable part intersect.

11. The method of claim 1, wherein a transition duration, which the robot requires to change from the work mode into the safety mode, is used as a time interval by the monitoring computer.

12. The method of claim 1, further comprising determining by the collision monitoring unit a time duration until a predicted entry of the person into the action range of the movable part, and delaying a switchover by the robot from the work mode to the safety mode such that the robot assumes the safety mode after elapse of the time duration.

13. The method of claim 1, wherein the action range of the person and the checking whether the action range of the person and the action range of the movable part intersect are executed repeatedly at predetermined times.

14. A robot arrangement for a handling system in an industrial environment, comprising:
   a robot including a drive and a part which is movable by the drive; and
   a safeguarding apparatus including
   a camera configured to determine a position and body posture of a person situated outside of an action range of the movable part of the robot,
   a monitoring computer configured to determine an action range of the person in response to the determined body posture to thereby define the action range by locations expected to be reachable within a predetermined time interval by the person, wherein the monitoring computer is configured to predict a movement of the person based on a behavior rule prescribed for a behavior of the person in a surrounding of the robot, said person always having a right-of-way and said person not stopping if said person crosses a path of the robot,
   the monitoring computer configured to determine a risk class RK0 which indicates no danger of a collision, or a risk class RK1 which indicates no acute risk of a collision but the person has a possibility to enter into a collision zone such that the robot is prepared, or a risk class RK2 which indicates that the person is too close to the robot such that there is an acute risk of a collision in response to data received by the camera; and a collision monitoring computer configured to check whether the action range of the person and the action range of the movable part intersect and switching the robot from a work mode into a safety mode to reduce a speed with which the movable part moves or to guide the movable part past the person, in the event the action range of the person and the action range of the movable part intersect so as to avoid a collision of the person with the movable part and injury to the person.

* * * * *